US012647633B2

(12) United States Patent
Tian et al.

(10) Patent No.: US 12,647,633 B2
(45) Date of Patent: Jun. 2, 2026

(54) CONTROL METHOD, CONTROL DEVICE, AND ELECTRONIC DEVICE

(71) Applicant: Lenovo (Beijing) Limited, Beijing (CN)

(72) Inventors: Hanhua Tian, Beijing (CN); Meng Luo, Beijing (CN); Zhiqin Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 56 days.

(21) Appl. No.: 17/550,794

(22) Filed: Dec. 14, 2021

(65) Prior Publication Data

US 2022/0321934 A1 Oct. 6, 2022

(30) Foreign Application Priority Data

Mar. 30, 2021 (CN) .......................... 202110341949.8

(51) Int. Cl.
| | |
|---|---|
| *H04N 21/258* | (2011.01) |
| *H04N 21/226* | (2011.01) |
| *H04N 21/41* | (2011.01) |
| *H04W 8/00* | (2009.01) |

(52) U.S. Cl.
CPC ... *H04N 21/25825* (2013.01); *H04N 21/2265* (2013.01); *H04N 21/25841* (2013.01); *H04N 21/4122* (2013.01); *H04W 8/005* (2013.01)

(58) Field of Classification Search
CPC ......... H04N 21/25825; H04N 21/2265; H04N 21/25841; H04N 21/4122; H04W 8/005
See application file for complete search history.

(56) References Cited

U.S. PATENT DOCUMENTS

| | | | | |
|---|---|---|---|---|
| 2004/0267981 A1* | 12/2004 | Kakemura | ............ | H04L 67/131 |
| | | | | 710/48 |
| 2005/0036509 A1* | 2/2005 | Acharya | ............ | H04N 21/4753 |
| | | | | 370/467 |
| 2007/0268877 A1* | 11/2007 | Buckley | ................ | H04W 48/18 |
| | | | | 370/338 |
| 2008/0242365 A1* | 10/2008 | Rokusek | ............... | H04W 68/02 |
| | | | | 455/41.2 |
| 2013/0079063 A1* | 3/2013 | Jouin | .................... | G06F 1/1649 |
| | | | | 455/566 |
| 2014/0359140 A1* | 12/2014 | Shankarraman | ........ | H04L 65/75 |
| | | | | 709/227 |

(Continued)

FOREIGN PATENT DOCUMENTS

| | | |
|---|---|---|
| CN | 110602319 A | 12/2019 |
| CN | 111182614 A | 5/2020 |
| CN | 112242980 A | 1/2021 |

*Primary Examiner* — James R Sheleheda
(74) *Attorney, Agent, or Firm* — ANOVA LAW GROUP, PLLC

(57) ABSTRACT

A control method, an electronic device, and a storage medium are provided. The method includes: obtaining a first screen projection instruction and determining a target display device to be projected; and switching a network to which an electronic device or the target display device is connected when the target display device and the electronic device executing the first screen projection instruction are not connected to a same network, such that output content of the electronic device is able to be display-outputted to the target display device.

20 Claims, 3 Drawing Sheets

Obtain the first screen projection instruction and determine the target display device to be projected ⟋ S1

Switch the network to which the electronic device or the the target display device is connected when the target display device and the electronic device executing the first screen projection instruction are not connected to the same network, such that the output content of the electronic device may be output to and displayed on the target display device ⟋ S2

(56)  References Cited

U.S. PATENT DOCUMENTS

| | | | |
|---|---|---|---|
| 2014/0364060 A1* | 12/2014 | Srivatsa ................ | H04W 8/005 |
| | | | 455/41.2 |
| 2015/0339274 A1* | 11/2015 | Pappu .................. | H04N 21/435 |
| | | | 715/205 |
| 2016/0173937 A1* | 6/2016 | Shih ................... | H04N 21/4524 |
| | | | 725/81 |
| 2017/0273009 A1* | 9/2017 | Wang ................... | H04W 48/02 |
| 2017/0359771 A1* | 12/2017 | Andreoli-Fang ..... | H04W 48/20 |
| 2020/0045756 A1* | 2/2020 | Clark ................... | H04W 24/08 |
| 2021/0092347 A1* | 3/2021 | Han ..................... | H04N 13/282 |
| 2022/0321934 A1* | 10/2022 | Tian ................. | H04N 21/25841 |

* cited by examiner

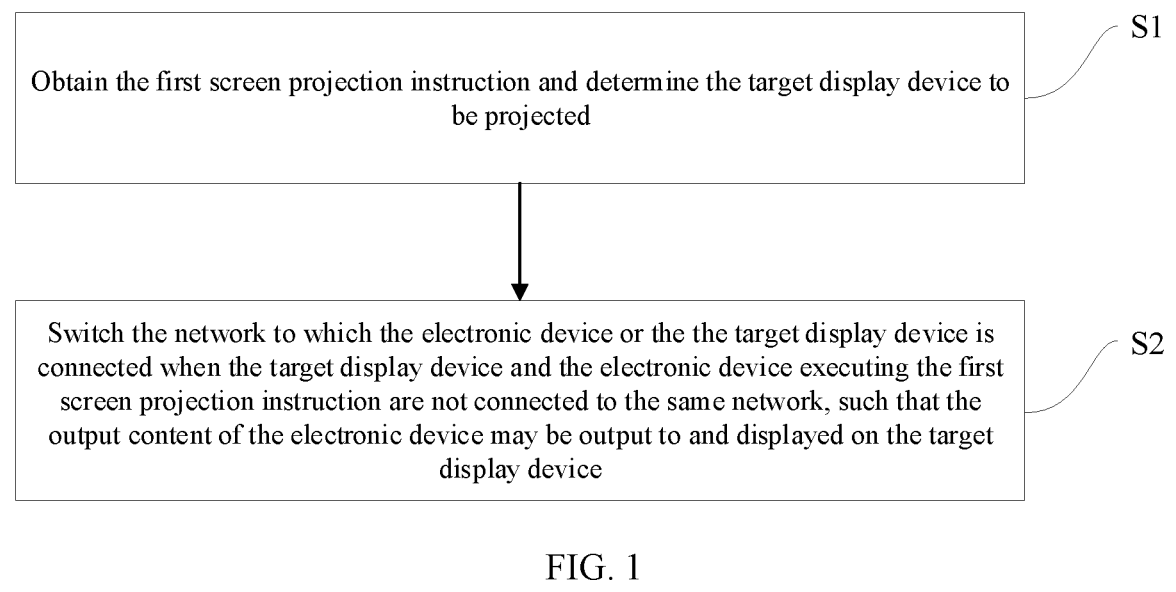

Obtain the first screen projection instruction and determine the target display device to be projected — S1

Switch the network to which the electronic device or the the target display device is connected when the target display device and the electronic device executing the first screen projection instruction are not connected to the same network, such that the output content of the electronic device may be output to and displayed on the target display device — S2

FIG. 1

Control device

Acquisition module 10

Switch module 20

FIG. 3

CONTROL METHOD, CONTROL DEVICE, AND ELECTRONIC DEVICE

CROSS-REFERENCE TO RELATED APPLICATION

This application claims the priority of Chinese Patent Application No. 202110341949.8, filed on Mar. 30, 2021, the content of which is incorporated herein by reference in its entirety.

TECHNICAL FIELD

The present disclosure generally relates to the field of technologies of electronic devices and technologies and, more particularly, relates to a control method, a control device, and an electronic device.

BACKGROUND

Wireless projection is to display a display screen of an electronic device on a display device to be projected in real-time through a projection operation. For example, when a user finds a movie on a smartphone, he can cast the movie on a TV for viewing through a screen projection operation to obtain a better viewing effect. However, when an electronic device is not connected to a wireless network, or when the electronic device is connected to a wireless network and a target display device is connected to another wireless network, the user needs to manually connect the wireless network, or manually connect the electronic device to another wireless network, to perform the screen projection operation to the target display device. The operation is complicated and the user experience is poor.

SUMMARY

One aspect of the present disclosure provides a control method. The method includes: obtaining a first screen projection instruction and determining a target display device to be projected; and switching a network to which an electronic device or the target display device is connected when the target display device and the electronic device executing the first screen projection instruction are not connected to a same network, such that output content of the electronic device can be display-outputted to the target display device.

Another aspect of the present disclosure provides a control device. The device includes: an acquisition module, configured to obtain a first screen projection instruction and determine a target display device to be projected; and a switch module, configured to: switch a network to which an electronic device or the target display device is connected when the target display device and the electronic device executing the first screen projection instruction are not connected to a same network, such that output content of the electronic device can be display-outputted to the target display device.

Another aspect of the present disclosure provides an electronic device, including a memory, configured to store program instructions for performing a control method; and a processor, coupled with the memory and, when executing the program instructions, configured to: obtain a first screen projection instruction and determine a target display device to be projected; and switch a network to which an electronic device or the target display device is connected when the target display device and the electronic device executing the first screen projection instruction are not connected to a same network, such that output content of the electronic device is able to be display-outputted to the target display device.

Another aspect of the present disclosure provides a non-transitory computer-readable storage medium, containing program instructions for, when executed by a processor, performing a control method. The method includes: obtaining a first screen projection instruction and determining a target display device to be projected; and switching a network to which an electronic device or the target display device is connected when the target display device and the electronic device executing the first screen projection instruction are not connected to a same network, such that output content of the electronic device can be display-outputted to the target display device.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 1 illustrates an exemplary control method consistent with various disclosed embodiments in the present disclosure;

FIG. 3 illustrates an exemplary control device consistent with various disclosed embodiments in the present disclosure.

DETAILED DESCRIPTION

Figure 2:
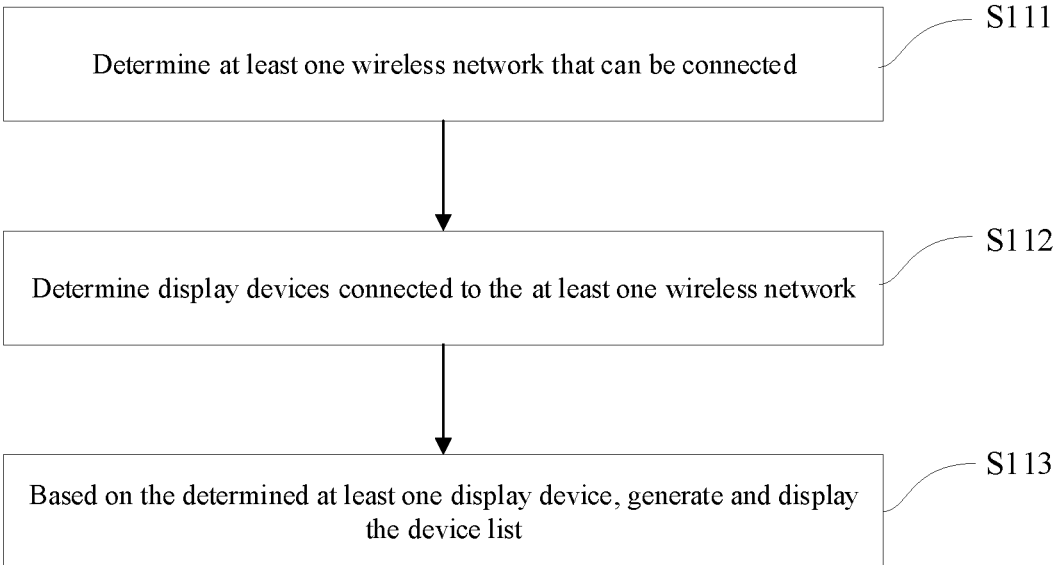
FIG. 2 illustrates S1 in an exemplary control method consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

One embodiment of the present disclosure provides a control method. The control method may be used to control an electronic device to perform a screen projection operation. The electronic device may be a smartphone, a tablet, a notebook computer, a desktop computer, or a smart car. FIG. 1 shows an exemplary control method provided by one embodiment of the present disclosure. As shown in FIG. 1, the control method may include S1 and S2.

In S1, a first screen projection instruction may be obtained and a target display device to be projected may be determined.

The first screen projection instruction may be used to instruct the electronic device to perform a screen projection operation on a display device. The display device may be an electronic device capable of outputting display content, such as a TV, a tablet computer, a notebook computer, a projector, a desktop computer, and so on. In specific implementations, the first screen projection instruction may be obtained in various ways, and the target display device to be projected may be determined based on the first screen projection instruction. The process will be described in detail below with reference to some specific embodiments.

The electronic device may generate the first screen projection instruction based on obtained text information in response to the obtained text information, and then determine the target display device to be projected based on the first screen projection instruction. The text information may be text information obtained by the electronic device from another electronic device. For example, in an application scenario of master-slave devices, a master device may send text information to a slave device, and the text information may contain relevant content used to generate the first screen projection instruction. After receiving the text information, the slave device may generate the first screen projection instruction based on the content of the text information. For another example, a server may send the text information to a terminal device, such that the terminal device may generate the first screen projection instruction based on the obtained text information and determine the target display device based on the first screen projection instruction. For another example, one of two electronic devices of the same user may send text information to another electronic device of the two electronic devices in response to the user's operation, such that the another electronic device may generate the first screen projection instruction based on the received text information. The text information may be text information stored locally in the electronic device. The electronic device may retrieve the text information locally, generate the first screen projection instruction based on the content in the text information, and then determine the target display device to be projected based on the first screen projection instruction. The electronic device may also display an instruction box, and the electronic device may generate the first screen projection instruction based on the text information input in the instruction box.

The electronic device may also generate the first screen projection instruction in response to an operation on an operable object, and determine the target display device to be projected based on the first screen projection instruction. For example, a screen projection icon may be configured on an operation interface displayed by the electronic device, and the electronic device may generate the first screen projection instruction in response to an operation on the screen projection icon. Alternatively, the electronic device may also pop up the operable interface in response to a playback operation for the output content. The operable interface may be used to prompt the user to choose whether to perform a screen projection operation, and the electronic device may generate the first screen projection instruction in response to a selection operation on a screen projection option on the operable interface.

The electronic device may also generate the first screen projection instruction in response to obtained voice information, and determine the target display device to be projected based on the first screen projection instruction. For example, the electronic device may be an electronic device with a voice recognition function such as a smart speaker, when the electronic device collects voice information through an audio collection device, the electronic device may perform voice recognition on the voice information based on a voice recognition technology to obtain corresponding text information, and then generate the first screen projection instruction based on the recognized text information. Of course, the voice information can also be voice information obtained by the electronic device from another electronic device. For example, the user may input the voice information through a smartphone and send the voice information to, a smart speaker. The smart speaker may generate the first screen projection instruction based on the obtained voice information.

The electronic device may also generate the first screen projection instruction in response to obtained eye movement information, and determine the target display device to be projected based on the first screen projection instruction. For example, the electronic device may be a head-mounted device. The head-mounted device may display an operation interface, and collect the user's eye image when the user views the operation interface to obtain the user's eye movement information based on the eye image. For example, the eye movement information may include gaze, blinking, or view change. The recognized eye movement information may be then matched with preset operation information. When the eye movement information matches the preset operation information, the first screen projection instruction may be generated. In one example, the electronic device may be a smartphone connected to a head-mounted device. The head-mounted device may collect eye images of the user while viewing other electronic devices in the space. The smartphone may obtain the eye images from the head-mounted device, and may generate the first projection instruction for controlling itself to perform the screen projection operation based on the eye images or the first screen projection instruction for controlling another electronic device to perform the screen projection operation.

The electronic device may also generate the first screen projection instruction in response to the user's operation gesture, and determine the target display device to be projected based on the first screen projection instruction. For example, the electronic device may be a head-mounted device. The head-mounted device may recognize the user's operation gesture on a virtual operation object displayed by the head-mounted device, and generate the first screen projection instruction. Alternatively, the head-mounted device may also recognize the user's operation gestures on other electronic devices in the space to generate the first screen projection instruction, and send the first screen projection instruction to the other electronic device, such that the other electronic device can determine the target display device for the projection. For description purposes only, the above embodiments are used as examples to illustrate obtaining the first screen projection instruction and determining the target display device to be projected, and should not limit the scope of the present disclosure.

In S2, when the target display device and the electronic device that executes the first screen projection instruction are not connected to a same network, a network to which the electronic device is connected or a network to which the target display device is connected may be switched, such that the output content of the electronic device is able to be output to and displayed on the target display device.

When that the target display device to be projected is determined based on the first screen projection instruction, it may be determined whether the target display device and the electronic device that executes the first screen projection instruction are connected to the same network. The network may be, for example, a local area network, a virtual local area network, a wireless local area network, an access network, a subnet, a network island, or other types of networks.

A network identification of the network to which the target display device is connected may be obtained, and a network identification of the network to which the electronic device is connected may be obtained. Then, it may be determined whether the target display device and the electronic device are connected to the same network based on these two network identifications. When the two network identities are the same, it may be determined that the target display device and the electronic device are connected to the same network. When the two network identities are different, it may be determined that the target display device and the electronic device are not connected to the same network. Taking a wireless local area network (WIFI) as an example, WIFI names of the networks to which the target display device and the electronic device are connected may be obtained respectively, and it may be determined whether the target display device and the electronic device are connected to the same network based on the WIFI names.

In another embodiment, the electronic device may interact with a network device forming its connected network to determine whether the target display device is located on the same network as it. For example, the electronic device may interact with a router or a server to determine whether the target display device is also located in the same subnet.

In another embodiment, address information of the target display device and address information of the electronic device may be obtained, and it may be determined whether the address information of the target display device and the address information of the electronic device meet a preset rule. It may be determined that the electronic device and target display device are connected to the same network when meeting the preset rule. For example, it may be determined whether the address information of the target display device and the address information of the electronic device are located in a same network segment. When it is determined that the address information of the target display device and the address information of the electronic device are located in the same network segment, the target display device and the electronic device may be determined to be located in the same local area network. When it is determined that the two address information are located in different network segments, it may be determined that the target display device and the electronic device are not connected to the same local area network.

For description purposes only, the above embodiments are used as examples to illustrate methods for determining whether the target display device and the electronic device are connected to the same network, and do not limit the scope of the present disclosure. In other embodiments, other methods may be used to determine whether the target display device and the electronic device are connected to the same network. For example, in another embodiment, address information of a network device forming the network to which the target display device is connected, and address information of a network device forming the network to which the electronic device is connected, may be obtained. Then, it may be determined whether the address information of the two network devices is the same. When they are the same, it may be determined that the target display device and the electronic device are connected to the same network, and when they are different, it may be determined that the target display device and the electronic device are not connected to the same network. In another embodiment, MAC addresses of network devices may be obtained and it may be determined whether the target display device and the electronic device are connected to the same network based on the MAC addresses of the network devices.

When it is determined that the target display device and the electronic device that executes the first screen projection instruction are not connected to the same network, the electronic device may switch the network to which it is connected, that is, the electronic device may switch to the network to which the target display device is connected, such that the electronic device and the target display device may be connected to the same network after the switch. For example, the network identifier of the network to which the target display device is connected may be acquired, and the electronic device may switch to the network to which the target display device is connected based on the acquired network identifier. Alternatively, the address information forming the network to which the target network device is connected may be acquired, and the electronic device may switch to the network to which the target display device is connected based on the acquired address information. In some embodiments, when it is determined that the target display device and the electronic device executing the first screen projection instruction are not connected to the same network, the electronic device may also send a network switch instruction to the target display device to control the target display device to switch to the network to which the electronic device is connected, such that the electronic device and the target display device may access the same network after the switch and then the electronic device may output and display its output content to the target display device. For example, the electronic device may send the display information to the target display device, such that the target display device could display the output content based on the received display information. The electronic device may also send the address information of the display information to the target display device, such that the target display device could obtain the display information based on the address information of the display information and then display the output content based on the obtained display information.

In the present disclosure, the target display device to be projected may be determined based on the obtained first screen projection instruction, and it may be determined whether the target display device and the electronic device that executes the first screen projection instruction are connected to the same network. When it is determined that the target display device and the electronic device are not connected to the same network, the electronic device and the target display device may be automatically switched to the same network such that the output content of the electronic device could be output to and displayed on the target display device. Correspondingly, the operation steps of the screen projection operation may be simplified, and the user experience may be improved.

In some embodiments, S1 for obtaining the first screen projection instruction and determining the target display device to be projected may include:

S11: displaying a device list in response to the obtained first screen projection instruction, such that the target display device to be projected is able to be determined from the device list. The device list may include at least one display device capable of being projected.

In one embodiment, after obtaining the first screen projection instruction, one or more display devices currently capable of being projected may be determined and the display device list based on the determined one or more display devices capable of being projected may be generated. It should be noted that the one or more display devices capable of being projected may include display devices that are precisely capable of being projected based on the current environment or the current location, and may also include display devices that are possible to be capable of being projected based on the current environment or the current location according to information determination.

The displayed device list may be used to present the display devices that can be projected to the user, such that the user could select the target display device to be projected from the device list. In one embodiment, the target display device to be projected may be determined from the device list based on the text information input by the user. For example, the device list may display: "1. The first display device; 2. The second display device; 3. The third display device; 4. The fourth display device.". When the user needs to select the fourth display device as the target display device, he may enter "#4" in a command bar, and the electronic device may select the fourth display device as the target display device accordingly.

The electronic device may determine an operated display device as the target display device based on the operation on the display devices in the device list. For example, the display unit of the electronic device may be a touch display unit. The electronic device may determine the touch-operated display device as the target display device in response to a touch operation on a display device in the device list. Alternatively, the electronic device may also determine the selected display device as the target display device in response to a selection operation on a display device in the device list by an operating device such as a mouse.

The electronic device may also determine the target display device from the display devices in the device list through a voice command. For example, the electronic device may be a smart speaker. When the device list is displayed, the display devices in the device list may also be broadcast by voice. The user may issue a voice command based on the content of the voice broadcast or the displayed device list to instruct the smart speaker to select the target display device. In other embodiments, the electronic device may also determine the target display device from the display devices in the device list based on operation gestures, eye movement information, or other information.

In some embodiments shown in FIG. 2, displaying the device list in response to the obtained first screen projection instruction in S11 may include S111 to S113.

In S111, at least one wireless network capable of connection may be determined.

In one embodiment, the electronic device may search for wireless networks to determine the at least one wireless network capable of connection. When one or more wireless networks are found, it may be determined whether the one or more wireless networks are capable of connection. For example, it may be determined whether one wireless network of the one or more wireless networks is an open wireless network. When it is determined that the wireless network is an open wireless network, it may be further determined that whether the wireless network is an accessible wireless network. In the case where it is determined that the wireless network is a restricted wireless network, it may be further determined whether the electronic device has the permission to access the wireless network. For example, when it is determined that the wireless network is an encrypted wireless network, it may be detected whether the electronic device stores the password of the wireless network locally. When the electronic device stores the password of the wireless network locally, it may be determined that the wireless network is an accessible wireless network. When the electronic device does not store the password of the wireless network locally, it may be determined that the wireless network is an inaccessible wireless network. One wireless network which was accessed by the electronic device in the searched wireless networks may also be determined based on historical data, and the wireless network which was accessed by the electronic device in the searched wireless networks may be determined as the accessible wireless network.

In another embodiment, the electronic device may also obtain location information that characterizes the current location of the electronic device, and determine at least one wireless network that can be accessed based on the location information of the current location. For example, when an electronic device accesses a wireless network, it may obtain the network identification of the wireless network and/or the address information of the network device forming the wireless network, such as the name of the WIFI network, or the MAC address of the router forming the WIFI network, and so on, and the location information of the current location. Based on the network identification and/or the address information, and the location information of the current location, an association relationship between the wireless network and the location information of the current location may be constructed, and the association relationship may be stored as the historical data. When the electronic device obtains the first screen projection instruction, it may obtain the location information of the current location and match it with the association relationship in the historical data to determine whether there is a wireless network associated with the location information of the current location. If yes, the associated wireless network may be determined as an accessible wireless network.

In S112, the display devices connected to the at least one wireless network may be determined.

When the at least one wireless network capable of connection is determined, the display devices connected to the at least one wireless network may be determined. For the wireless network to which the electronic device has been connected, the electronic device may interact with the network device forming the wireless network to determine the display devices connected to the wireless network. For example, an acquisition request may be sent to the network device, and the network device may feedback the information of the display devices to the electronic device. Or, the network device may also broadcast the acquisition request in the wireless network, and the display devices capable of projection may feedback the device information to the electronic device through the network device.

For a wireless network to which the electronic device is not connected, the electronic device may obtain the network identification or address information of the wireless network. And then the electronic device may determine the display devices connected to the wireless network based on the network identification or address information.

In one embodiment, when the electronic device is connected to any wireless network, the network identification and/or address information of the wireless network may be obtained, and the display devices connected to the wireless network may be determined. Based on the network identification and/or address information, and the display devices connected to the wireless network, an association relationship between the wireless network and the display devices may be constructed and saved as historical data. The historical data may be stored locally in the electronic device or in another electronic device such as a server.

Preferably, after determining the display devices connected to the wireless network, the display devices connected to the wireless network may further be screened based on the device information of the display devices, to filter out a fixed display device and construct an association relationship between the fixed display device and the wireless network. The fixed display device may include a display device that is disposed fixedly, such as a TV, a speaker, a projector, or a large-screen monitor. The fixed display device may be determined based on the device types of the display devices. The fixed display device may also include a display device that has a fixed connection relationship with the wireless network. For example, a display device such as a tablet computer is connected to the wireless network at a fixed time period of the day or almost a whole day. There is a fixed connecting relationship between the display device and the wireless network. When the electronic device determines at least one wireless network that can be connected, the network identification and/or address information of the wireless network may be obtained. The network identification and/or address information may be matched with the local historical data of the electronic device to obtain the historical data. The association relationship in the historical data may be used to determine the display devices connected to the wireless network at the historical moment.

In another embodiment, the electronic device may also generate an acquisition request based on the network identification or address information of the wireless network, and send the interaction request to another electronic device to determine the display devices connected to the at least one wireless network. The another electronic device may be, for example, a server. For example, the server may store historical data uploaded by the user or shared by other users. After receiving the acquisition request, the server may match the network identification or address information in the acquisition request with the historical data, to determine the display devices connected to the wireless network at the historical moment. The device information of the determined display devices may be fed back to the electronic device. The another electronic device may also be a network device that forms the wireless network. In this case, the acquisition request sent by the electronic device to the network device may also include verification information for verifying the authority of the electronic device. When the network device receives the acquisition request, the authority of the electronic device may be verified first based on the verification information in the acquisition request. When the electronic device is determined to have the authority, the device information of the display devices connected to the wireless network may be acquired, or the acquisition request may be broadcasted in the wireless network, such that the display device is capable of projection may feedback its device information. And then the network device may feedback the device information of the display device to the electronic device. The verification information may be, for example, accounts and passwords of the wireless network, or a key for the user to perform security verification. Correspondingly, without being connected to the wireless network, the device information of the display devices connected to the wireless network may be obtained safely.

In S113, the device list may be generated and displayed based on the determined at least one display device.

The determined at least one display device may include the display devices in a wireless network to which the electronic device is connected, and display devices in a wireless network to which the electronic device is not connected but capable of being connected. Therefore, the determined at least one display device may include a plurality of display devices connected to a plurality of wireless networks.

When the display devices connected to the at least one wireless network are determined, the device list may be generated based on the at least one display device, and the device list may be displayed by the electronic device. In one embodiment, when the display devices connected to at least one wireless network are determined, the display devices may be classified and displayed based on the wireless networks. For example, the device list may look like this:

The first wireless network:
Display device A
Display device B
The second wireless network:
Display device C
The third wireless network:
Display device D
Display device E.

In another embodiment, the display devices may be classified based on wireless networks to which the electronic device is connected and wireless networks to which the electronic device is not connected. For example, the wireless networks that can be connected may include the first wireless network, the second wireless network, and the third wireless network. The display devices connected to the first wireless network may include display devices A and B; the display devices connected to the second wireless network may include display device C; and the display devices connected to the third wireless network may include display devices D and E. Correspondingly, the device list may be:

Display device A
Display device B
Display device C (offline, network switching is required)
Display device D (offline, network switching is required)
Display device E (offline, network switching is required).

That is, the display devices in the device list that are not on the same network as the electronic device may be identified through a first identifier such as "offline, network switching is required", such that the user may determine which display devices are not connected to the same network as the electronic device. Of course, the first identifier is not limited to the above-mentioned embodiments, and may also be other text identifiers or image identifiers.

In another embodiment, the display devices may also be sorted based on the projection time when the electronic device performs the projection operation on the display devices. The projection time may only include the execution of the first projection instruction on the display device by the electronic device that executes the first projection instruction, and may also include the projection time when the other electronic device performs the projection operation on the display device. The sorting may be in descending order based on the projection time, or in ascending order based on the projection time. Assuming that the current time is Mar. 25, 2021, the last projection time of the display device A is Mar. 20, 2021, and the last projection time of the display device B is Mar. 16, 2021, the last projection time of the display device C is Mar. 18, 2021, the last projection time of the display device D is Mar. 21, 2021, the last projection time of the display device E is Mar. 15, 2021, for example, the device list may be as follows:

Display device D (Mar. 21, 2021)

Display device A (Mar. 20, 2021)

Display device C (Mar. 18, 2021)

Display device B (Mar. 16, 2021)

Display device E (Mar. 15, 2021).

In some other embodiments, the display devices in the device list may be sorted based on the number of times that the projection operation is performed on the display device, the bandwidth of the wireless networks to which the display devices are connected, or the device types of the display devices. For example, one display device in the device list with a larger number of times that the projection operation is performed on the display device may be ranked higher, or one display device in one wireless network with the larger bandwidth may be ranked higher, or according to device types such as TV, tablet computer, smart speaker, projector, or notebook computer, the display devices may be classified and sorted.

In some embodiments, the method may further include: updating the device list according to change information of the networks to which the electronic device is connected or location change information of the electronic device.

That is, when the network to which the electronic device is connected changes, or when the location of the electronic device changes, the displayed device list may be updated, to make the device list match the current network connection status or current location of the electronic device. The timeliness of the displayed device list may be improved. For example, the first identifier in the device list may be updated based on the change information of the network to which the electronic device is connected. When the electronic device switches from the first wireless network to the second wireless network, the device list before switching may be as follows:

Display device A

Display device B

Display device C (offline, network switching is required)

Display device D (offline, network switching is required)

Display device E (offline, network switching is required).

After the electronic device switches from the first wireless network to the second wireless network, the device list may be as follows:

Display device A (offline, network switching is required)

Display device B (offline, network switching is required)

Display device C

Display device D (offline, network switching is required)

Display device E (offline, network switching is required).

In another embodiment, the display devices in the display list may be updated according to the change information of the networks to which the electronic device is connected. The electronic device may switch from the first wireless network to the second wireless network. Before switching, the display devices in the first wireless network may include the display devices currently connected to the first wireless network determined based on the interaction between the electronic device and the network device, and the display devices in the second wireless network and the third wireless network may be determined based on the matching of network identifiers and historical data. After switching, the electronic device may interact with the network device forming the second wireless network and the current display devices connected to the second wireless network may be determined based on the interaction. For example, the display devices currently connected to the second wireless network may not include the display device C, but include the F display device. Correspondingly, the device list before switching may be as follows:

Display device A

Display device B

Display device C

Display device D

Display device E.

The device list after switching may be:

Display device A

Display device B

Display device F

Display device D

Display device E.

In actual application, the device list may also be updated based on the location change information of the electronic device. For example, when the at least one wireless network that can be connected is determined based on the location information of the current location, before the location of the electronic device changes, the determined wireless networks that can be connected may include the first wireless network, the second wireless network, and the third wireless network. After the location of the electronic device changes, the determined wireless networks that can be connected may include the fourth wireless network, and the display devices connected to the fourth wireless network may only include the display device G. Correspondingly, the device list after the location change may only include the display device G.

In some embodiments, the method may further include updating the device list according to the network information to which the target display device is connected.

That is, when the network to which the target display device is connected changes, the device list may be also updated synchronously to ensure the timeliness of the device list. The network information may be, for example, the network identification of the network to which the target display device is connected, or the address information of the network device that forms the network to which the target display device is connected. For example, when it is determined that the display device C which is the target display device is not connected to the same network as the electronic device that executes the first screen projection instruction, the display device C in the device list may be marked with the first identifier, for example, "offline, need to switch network", etc. The display device C may switch from the second wireless network to the first wireless network in response to the switch network instruction sent by the electronic device. After the switch, both the display device C and the electronic device may be connected to the first wireless network. At this time, The first identifier used to identify the display device C may be removed from the device list.

For another example, the target display device may switch network in response to another user's instruction. The network after the target network device switches may not be a network to which the electronic device executing the first screen projection instruction is connected. For example, the target display device may switch from an open network to a restricted network, and the electronic device may not have access authority to the restricted network. Correspondingly, the target display device may be removed from the device list after the switch. Further, when it is determined that the target display device to be projected cannot be projected by the electronic device due to network switching or the location change of the electronic device, the electronic device may display a prompt message to remind the user that the target display device cannot be projected.

In some embodiments, determining the target display device to be projected may include: determining the target display device within a target range that can be projected based on a device identifier carried in the first screen projection instruction.

The device identifier may be used to uniquely identify the display device, such as device number, device name, or device address. The device identifier may also be identification information used to identify a type of display device, for example, used to identify a TV, a tablet, or a projector. The device identification may also be the identification information of a display device used to identify a region, for example, information such as room number, conference room name, or room title.

In one embodiment, the electronic device may generate the first screen projection instruction in response to the obtained text information. The text information may carry the device identifier for identifying the display device. For example, the electronic device may display an instruction box through which the screen projection instruction number can be input. Correspondingly, the instruction box may pop up a prompt message for selecting the target display device. For example, it may pop up a device list including display devices that are capable of projection, and the device list may include a number of each display device. The user may enter the number of the target display device in the instruction box, to determine the corresponding display device as the target display device to be projected.

In another embodiment, the electronic device may generate the first screen projection instruction in response to the obtained voice information, and the voice information may carry the device identifier for identifying the display device. For example, taking the electronic device as a smart speaker as an example, the user may send a voice message to the smart speaker, such as "Hello Lenovo, cast the screen to the TV." The smart speaker may determine whether the display devices in the wireless network that can be connected include a TV. If there is a TV, the screen projection operation may be performed on the TV. If there is a plurality of TVs, the user may be prompted to select one from the plurality of TVs. If there is no TV, the user may be prompted that there is no display device that meets the requirements.

In another embodiment, the electronic device may generate the first screen projection instruction in response to the operation gesture, and the device identification of the display device may be determined based on the operation object of the operation gesture. For example, the head-mounted device may capture the user's operation gesture on the display device in the space. For example, the user may perform a drag gesture from the electronic device to the display device, and the head-mounted device may determine an electronic device at the starting point of the drag gesture to be the electronic device that executes the first projection instruction, and a display device at the end of the drag gesture to be the target display device to be projected, according to the drag gesture. The head-mounted device may obtain the device identifier of the electronic device and the device identifier of the display device, respectively, and then generate the first screen projection instruction based on the device identifier of the electronic device and the device identifier of the display device. After the electronic device receives the first screen projection instruction, it may determine the target display device according to the device identifier of the display device in the first screen projection instruction.

In some other embodiments, the device identifier capable of identifying the display device may also be obtained based on other information, and the device identifier of the display device may be set up in the generated first projection instruction, such that the electronic device may determine the target display device according to the device identifier of the display device.

In some embodiment, determining the target display device to be projected may include: obtaining historical data of a target user, and determining the target display device at least based on the historical data.

The historical data may include the operation record of the target user performing the screen projection operation. The operation record may include the device identification of the electronic device that executed the first screen projection instruction, the device identification of the display device being projected, the projection time of the screen projection operation, or other data. In one embodiment, based on historical data and preset logical relationships, the display devices in the historical data as the screen projection objects may be sorted. And then according to the sorting order, it can be judged whether each display device is capable of being projected. A top display device that is capable of being projected may be determined as the target display device. For example, when the electronic device obtains the first screen projection instruction, it may sort the display devices as the screen projection objects based on the historical data according to the screen projection time, or sort the display devices according to the number of screen projections. Whether each display device is capable of being projected may be determined, and the display device is capable of being projected in the top rank may be determined as the target display device.

The historical data may also include the network to which the electronic device is connected during the projection operation. When the first projection instruction is obtained, the projection object of the screen projection operation executed by the electronic device in the current connected network may be determined based on the historical data and the network to which the electronic device is connected currently. For example, the projection object of the most recent projection operation under the currently connected network may be used as the target display device.

The historical data may also include location information when the electronic device performs the screen projection operation. When the first screen projection instruction is obtained, based on the location information of the current location and the location information in the historical data, the screen projection object of the screen projection operation at the current location at the historical moment may be determined and used as the target display device. For example, when it is determined through a positioning operation that the electronic device is located in the home of the target user, and it is determined based on historical data that the display device with the most screen projections is the TV in the living room when the target user performs the projection operation at home, the TV in the living room may be determined as the target display device.

In some other embodiment, determining the target display device to be projected may include: obtaining the device information of the display devices in the environment of the electronic device or the network to which the electronic device is connected, and determining the target display device based on the display task information carried by the first screen projection instruction and the device information of the display devices.

The device information may include the device type information of the display device, the location information of the display device, the display resolution of the display device, and so on. The display task information may include information used to identify the output content of the electronic device, for example, the format, data amount, image resolution, or content type of the output content. For example, when it is determined that there is a plurality of display devices capable of being projected under the current environment of the electronic device or the connected network, and the display resolution of each display device is determined respectively, an image resolution of output video of the electronic device may be determined based on the display task information and one of the plurality of the display devices whose display resolution matches the image resolution may be determined as the target display device, such that the video may be displayed clearly. In another example, when it is determined that the current environment of the electronic device has a plurality of display devices such as a projector, a tablet computer, or a basic computer, and it is determined that the electronic device is outputting a Powerpoint document based on the displayed character information, the projector may be determined as the target display device. Correspondingly, the output content of the electronic device may be display-outputted to a display device matching the output content.

In some other embodiment, determining the target display device to be projected may include: processing the obtained first projection instruction into a broadcast request and broadcasting the broadcast request to the space environment where the electronic device is located; and when a display device gives feedback in response to the broadcast request, determining that the display device as the target display device.

The space environment may be the cyberspace environment where the electronic device is located. It may not be limited to the network to which the electronic device is connected and may also include the virtual local area network, local area network, metropolitan area network, etc. in an upper level of the currently connected network. For example, the electronic device may be connected to a subnet of the current local area network, and the display device may be connected to another subnet of the current local area network. When the electronic device obtains the first screen projection instruction, the first screen projection instruction may be processed into the broadcast request and the broadcast request may be broadcasted to the local area network. Correspondingly, the display devices under one or more subnets in the local area network may also receive the broadcast request. One display device may feedback the information to the electronic device when it is determined that the device information of itself matches the broadcast request, and the electronic device may determine the display device feeding back the information as the target display device. In this way, when the electronic device and the display device are not connected to the same network, the electronic device may also be capable of recognizing the display devices and determining the display device as the target display device. The electronic device may be capable of determining the target display device in a wide cyberspace environment.

In some embodiments, switching the network to which the electronic device or the target display device is connected may include: when the electronic device is not connected to any network, connecting the electronic device to the network to which the target display device is connected.

When it is determined that the electronic device is not connected to any network and the target display device to be projected is determined based on the first projection instruction, the network identification of the network to which the target display device is connected or the address information of the network device forming the network may be obtained. The electronic device may be connected to the network to which the target display device is connected based on the obtained network identification or the address information of the network device. In this way, the operation steps for switching networks may be simplified, the response speed of the projection operation may be improved, and the response time may be shortened, to improve the user experience. Specifically, for example, the WIFI name and password of the WIFI network to which the target display device is connected may be obtained, and the electronic device may be connected to the WIFI network to which the target display device is connected based on the WIFI name and password.

In some embodiments, switching the network to which the electronic device or the target display device is connected may include: when the electronic device is connected to the first network and the target display device is connected to the second network, controlling the network connection of the electronic device to switch from the first network to the second network, or controlling the network connection of the target display device to switch from the second network to the first network.

Specifically, when the electronic device is connected to the first network and the target display device is connected to the second network, the first network information of the first network and the second network information of the second network may be obtained respectively. Based on the first network information, the second network information, and the preset logical relationship, the network connection of the electronic device may be controlled to switch from the first network to the second network, or the network connection of the target display device may be controlled to switch from the second network to the first network. The first network information may include information to characterize the network quality of the first network, and the second network information may include information to characterize the network quality of the second network. For example, the network information may include information such as signal strength, the number of devices connected to the network, or bandwidth. In this way, the electronic device and the target display device may be connected to a network with the better network quality.

For example, when the number of devices connected to the first network is greater than the number of devices connected to the second network, the network connection of the electronic device may be controlled to switch from the first network to the second network. Or, when the signal strength of the first network is better than the signal strength of the second network, the network connection of the electronic device may be controlled to switch from the first network to the second network. Or, when the bandwidth of the first network is less than the bandwidth of the second network, the electronic device may generate a network switch instruction and send the network switch instruction to the target display device, to control the network connection of the target display device to switch from the second network to the first network.

Since the electronic device and the target display device are not connected to the same network, in a specific implementation, the electronic device may send the network switch instruction to another electronic device such as a server, and the other electronic device may send the network switch instruction to the target display device. Or, the electronic device may also process the network switch instruction into a broadcast request, and then broadcast the broadcast request in the cyberspace environment where the electronic device and the target display device are located, such that the target display device is capable of obtaining the network switch instruction.

Figure 3:
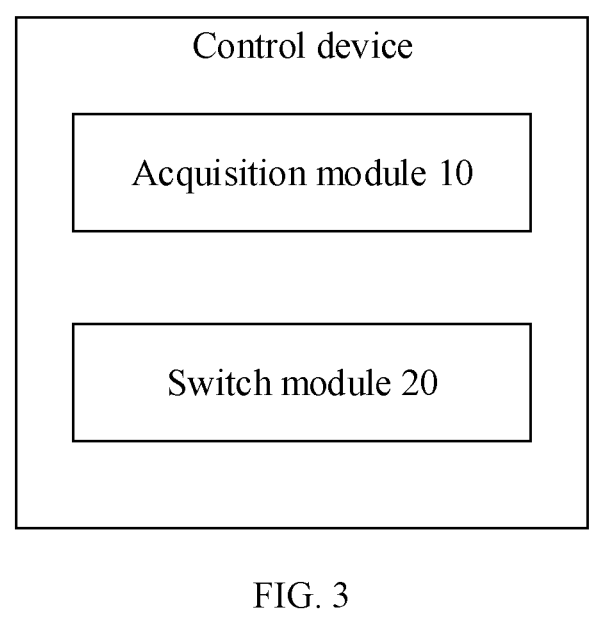

The present disclosure also provides a control device. As shown in FIG. 3, in one embodiment, the control device may include an acquisition module 10 and a switch module 20.

The acquisition module 10 may be configured to obtain the first screen projection instruction and determine the target display device to be projected.

The switch module 20 may be configured to switch the network to which the electronic device or the target display device is connected when the target display device and the electronic device executing the first screen projection instruction are not connected to the same network, such that the output content of the electronic device may be display-outputted to the target display device.

In some embodiments, the acquisition module 10 may be further configured to: in response to the obtained first screen projection instruction, display a device list, such that the target display device to be projected may be determined from the device list. The device list may include at least one display device that can be projected.

In some embodiments, the acquisition module 10 may be further configured to: determine at least one wireless network that can be connected; determine display devices connected to the at least one wireless network; and based on the determined at least one display device, generate and display the device list.

In some embodiments, the acquisition module 10 may be further configured to: search for the at least one wireless network that can be connected; or determine the at least one wireless network that can be connected based on the location information that characterizes the current location of the electronic device.

The acquisition module 10 may be further configured to: acquire the network identifier of the wireless network; and based on the network identifier, determine the display devices connected to the wireless network.

In some embodiments, the acquisition module 10 may be further configured to: acquire historical data including display devices connected to the wireless network; and match the network identifier with the historical data to determine the display devices connected to the wireless network.

In some embodiments, the acquisition module 10 may be further configured to: configure a first identifier for the display devices in the device list that is not connected to the same network as the electronic device; or, update the device list based on the change information of the network to which the electronic device is connected or location change information of the electronic device; or, update the device list based on the network information of the network to which the target display device is connected.

In some embodiments, the acquisition module 10 may be further configured to: determine the target display device capable of being projected within the target range based on the device identifier carried in the first screen projection instruction; or obtain the historical data of the target user, and determine the target display device based at least on the historical data; or, obtain the display task information and/or screen projection device information of the display device in the environment where the electronic device is located or in the network to which the electronic device is connected, and determine the target display device based at least on the display task information and/or screen projection device information.

In some embodiments, the acquisition module 10 may be further configured to: obtain the device information of the display devices under the environment where the electronic device is located or the network to which the electronic device is connected, and determine the target display device based on the display task information carried by the first screen projection instruction and the device information of the display device.

In some embodiments, the switch module 20 may be configured to: when the electronic device is not connected to any network, connect the electronic device to the network to which the target display device is connected; or, when the electronic device is connected to the first network and the target display device is connected to the second network, control the network connection of the electronic device to switch from the first network to the second network, or control the network connection of the target display device to switch from the second network to the first network.

The present disclosure also provides an electronic device. The electronic device may at least include a memory and a processor. The memory may be configured to store executable programs. The processor may be configured to execute the executable programs stored in the memory, to implement the methods provided by various embodiments of the present disclosure.

The present disclosure also provides a storage medium. The storage medium may be configured to store computer programs. When the computer programs are executed, the methods provided by various embodiments of the present disclosure may be implemented.

In the present disclosure, the target display device to be projected may be determined based on the obtained first screen projection instruction, and it may be determined whether the target display device and the electronic device that executes the first screen projection instruction are connected to the same network. When it is determined that the target display device and the electronic device are not connected to the same network, the electronic device and the target display device may be automatically switched to the same network such that the output content of the electronic device could be output to and displayed on the target display device. Correspondingly, the operation steps of the screen projection operation may be simplified, and the user experience may be improved.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A control method, comprising:

obtaining a first screen projection;

in response to the obtained first screen projection instruction, displaying a device list including a plurality of display devices, wherein in the device list, network connection information of each of the plurality of display devices is displayed;

determining, from the device list, a target display device to be projected, including:

sorting and displaying the plurality of display devices in the device list according to at least one of:

a last projection time when the electronic device performs projection operation on each of the plurality of display devices;

a number of times that projection operation is performed on each of the plurality of display devices;

a bandwidth of a network to which each of the plurality display devices is connected; or a device type of each of the plurality of display devices; and determining one of the plurality of display devices as the target display device; and in response to the electronic device being connected to a first wireless local area network (WIFI) network and the target display device being connected to a second WIFI network different from the first WIFI network, controlling the target display device to switch from being connected to the second WIFI network to being connected to the first WIFI network, such that the output content of the electronic device is able to be display-outputted to the target display device.

2. The method according to claim 1, wherein displaying the device list in response to the obtained first screen projection instruction includes:

determining at least one wireless network that is able to be connected;

determining at least one display device connected to the at least one wireless network; and based on the determined at least one display device, generating and displaying the device list.

3. The method according to claim 2, wherein:

determining the at least one wireless network that is able to be connected includes:

searching for the at least one wireless network that is able to be connected; or determining the at least one wireless network that is able to be connected based on location information indicating current location of the electronic device; and/or determining the at least one display device connected to the at least one wireless network includes:

acquiring a network identifier of a wireless network of the at least one wireless network; and determining the at least one display device connected to the wireless network based on the network identifier.

4. The method according to claim 3, wherein determining the at least one display device connected to the wireless network based on the network identifier includes:

acquiring historical data including display devices connected to the wireless network; and matching the network identifier with the historical data to determine the at least one display device connected to the wireless network.

5. The method according to claim 1, further including:

configuring a first identifier for one or more display devices in the device list that are not connected to the same network as the electronic device; or updating the device list based on change information of the first network to which the electronic device is connected or location change information of the electronic device; or updating the device list based on network information of the second network to which the target display device is connected.

6. The method according to claim 1, wherein determining the target display device to be projected further includes:

determining a target display device capable of being projected within a target range based on a device identifier carried in the first screen projection instruction; or obtaining historical data of a target user, and determining the target display device at least based on the historical data; or obtaining display task information and/or screen projection device information of display devices in an environment where the electronic device is located or in the first network to which the electronic device is connected, and determining the target display device based at least on the display task information and/or screen projection device information.

7. The method according to claim 1, wherein determining the target display device to be projected further includes:

obtaining device information of the display devices in an environment where the electronic device is located or the first network to which the electronic device is connected, and determining the target display device based on display task information carried by the first screen projection instruction and the device information of the display devices.

8. The method according to claim 1, wherein the network connection information of each of the plurality of displaying devices includes at least one of:

a network to which each of the plurality of displaying devices is connected; or a network connection status of each of the plurality of displaying devices.

9. The method according to claim 1, wherein in the device list, the plurality of displaying devices are classified and displayed based on a network to which each of the plurality of displaying devices is connected.

10. The method according to claim 1, wherein in the device list, the plurality of displaying devices are sorted and displayed based on at least one of:

the last projection time when the electronic device performs projection operation on each of the plurality of display devices; or the number of times that projection operation is performed on each of the plurality of display devices.

11. The method according to claim 1, wherein displaying the device list in response to the obtained first screen projection instruction includes:

determining at least one wireless network that is able to be connected based on location information indicating current location of the electronic device;

determining at least one display device connected to the at least one wireless network; and based on the determined at least one display device, generating and displaying the device list.

12. The method according to claim 1, wherein controlling the target display device to switch from being connected to the second WIFI network to being connected to the first WIFI network includes:

in response to the number of the devices connected to the first WIFI network being less than the number of the devices connected to the second WIFI network, controlling the target display device to switch from being connected to the second WIFI network to being connected to the first WIFI network.

13. The method according to claim 1, further comprising:

obtaining network address information of the target display device and network address information of the electronic device; and in response to determining that the network address information of the target display device and the network address information of the electronic device are located in different network segments, determining that the electronic device is connected to the first WIFI network and the target display device is connected to the second WIFI network different from the first WIFI network.

14. The method according to claim 1, further comprising:

obtaining device information of each of the plurality of display devices, the device information of each of the plurality of display devices including a display resolution of the each of the plurality of display devices;

wherein:

the first screen projection instruction includes an image resolution of an output content of the electronic device; and determining one of the plurality of display devices as the target display device includes:

determining one of the plurality of display devices as the target display device based on the device information, the display resolution of the one of the plurality of display devices being same as the image resolution of the output video of the electronic device.

15. An electronic device, comprising:

a memory, configured to store program instructions for performing a control method; and a processor, coupled with the memory and, when executing the program instructions, configured to:

obtain a first screen projection instruction;

in response to the obtained first screen projection instruction, display a device list including a plurality of display devices, wherein in the device list, network connection information of each of the plurality of display devices is displayed;

determine, from the device list, a target display device to be projected, including:

sorting and displaying the plurality of display devices in the device list according to at least one of:

a last projection time when the electronic device performs projection operation on each of the plurality of display devices;

a number of times that projection operation is performed on each of the plurality of display devices;

a bandwidth of a network to which each of the plurality display devices is connected; or a device type of each of the plurality of display devices; and determining one of the plurality of display devices as the target display device; and in response to the electronic device being connected to a first wireless local area network (WIFI) network and the target display device being connected to a second WIFI network different from the first WIFI network, controlling the target display device to switch from being connected to the second WIFI network to being connected to the first WIFI network, such that output content of the electronic device is able to be display-outputted to the target display device.

16. The device according to claim 15, wherein, when being configured to display the device list in response to the obtained first screen projection instruction, the processor is configured to:

determine at least one wireless network that is able to be connected;

determine at least one display device connected to the at least one wireless network; and based on the determined at least one display device, generate and display the device list.

17. The device according to claim 16, wherein:

when being configured to determine the at least one wireless network that is able to be connected, the processor is configured to:

search for the at least one wireless network that is able to be connected; or determine the at least one wireless network that is able to be connected based on location information indicating current location of the electronic device;

and/or when being configured to determine the at least one display device connected to the at least one wireless network, the processor is configured to:

acquire a network identifier of a wireless network of the at least one wireless network; and determine the at least one display device connected to the wireless network based on the network identifier.

18. The device according to claim 15, wherein the processor is further configured to:

configure a first identifier for one or more display devices in the device list that are not connected to the same network as the electronic device; or update the device list based on change information of the first network to which the electronic device is connected or location change information of the electronic device; or update the device list based on network information of the second network to which the target display device is connected.

19. The device according to claim 15, wherein when being configured to determine the target display device to be projected, the processor is further configured to:

determine a target display device capable of being projected within a target range based on a device identifier carried in the first screen projection instruction; or obtain historical data of a target user, and determining the target display device at least based on the historical data; or obtain display task information and/or screen projection device information of display devices in an environment where the electronic device is located or in the first network to which the electronic device is connected, and determine the target display device based at least on the display task information and/or screen projection device information.

20. A non-transitory computer-readable storage medium, containing program instructions for, when executed by a processor, performing a control method, the method comprising:

obtaining a first screen projection instruction;

in response to the obtained first screen projection instruction, displaying a device list including a plurality of display devices, wherein in the device list, network connection information of each of the plurality of display devices is displayed;

determining, from the device list, a target display device to be projected, including:

sorting and displaying the plurality of display devices in the device list according to at least one of:

a last projection time when the electronic device performs projection operation on each of the plurality of display devices;

a number of times that projection operation is performed on each of the plurality of display devices;

a bandwidth of a network to which each of the plurality display devices is connected; or a device type of each of the plurality of display devices; and determining one of the plurality of display devices as the target display device; and in response to the electronic device being connected to a first wireless local area network (WIFI) network and the target display device being connected to a second WIFI network different from the first WIFI network, controlling the target display device to switch from being connected to the second WIFI network to being connected to the first WIFI network, such that the output content of the electronic device is able to be display-outputted to the target display device.

* * * * *